United States Patent [19]

Vaillancourt

[11] 4,285,529
[45] Aug. 25, 1981

[54] SLED WITH OCCUPANT PROTECTION

[76] Inventor: Ellen M. Vaillancourt, 3 Victoria St., Kapuskasing, Ontario, Canada, P5N 1K6

[21] Appl. No.: 72,390

[22] Filed: Sep. 4, 1979

[51] Int. Cl.³ ............................................. B62B 13/00
[52] U.S. Cl. .................... 280/12 R; 280/24; 296/78 R
[58] Field of Search ................ 280/12 R, 12 A, 12 B, 280/12 C, 12 E, 12 F, 12 M, 12 S, 12 W, 17, 18, 19, 47.39, 24, 87.01; 296/1 B, 35.1, 19, 78 R, 102; 114/71, 43, 39; 9/1.5, 4 R, 310 G

[56] References Cited

U.S. PATENT DOCUMENTS

| | | | |
|---|---|---|---|
| 121,453 | 12/1871 | Falkingham | 280/47.39 |
| 1,646,790 | 10/1927 | Hornquist | 280/12 R |
| 3,000,022 | 9/1961 | Cathey et al. | 9/4 R |
| 3,479,980 | 11/1969 | Simmons | 280/12 R |
| 3,716,880 | 2/1973 | Sorenson | 9/310 G |
| 3,746,357 | 7/1973 | Haskins | 296/19 |

FOREIGN PATENT DOCUMENTS 56003  12/1935  Norway ............................... 280/12 R

*Primary Examiner*—David M. Mitchell
*Attorney, Agent, or Firm*—Hirons, Rogers & Scott

[57] ABSTRACT

A sled for transportation of passengers or cargo, especially small children and infants, comprises a passenger receiving enclosure having a base and a cover, and a laterally presented side access opening. The enclosure can swivel about a vertical axis relative to the runners of the sled, so that the access aperture can be presented in any chosen direction, e.g., away from the wind, to afford additional protection to the rider.

4 Claims, 3 Drawing Figures

SLED WITH OCCUPANT PROTECTION

FIELD OF THE INVENTION

The present invention relates to sleds, and more particularly to a novel form of sled which provides enhanced protection for the rider or occupant.

BACKGROUND OF THE INVENTION

During the winter months in cold climates, where significant amounts of snow accumulate and remain for extended periods on the ground, the simple hand-drawn sled remains a popular and practical means for adults to transport infants and small children, e.g. on short outdoor walks, shopping trips, excursions and the like. It is however necessary that an infant or small child be well protected against the winter elements. The normal form of flat, open sled does not provide adequate safety or protection against the elements. The popular form of small sled provided with a back rest and side rails, in which the child may sit upright whilst being pulled along, is an improvement as far as safety is concerned, but exposes the child to the elements, especially cold winds, to an even greater extent. There is a need for a child's sled which provides fuller and better protection.

BRIEF DESCRIPTION OF THE PRIOR ART

The mounting and transportation of shelters of one type or another, on skis or snow runners, is well known. Some such shelters could conceivably contain occupants/riders and have the effect of affording them protection against the elements during transportation.

U.S. Pat. No. 3,854,746 Flynn et al., discloses a collapsible fishing shanty or hut, mounted on snow runners so that it may be drawn across snow covered or ice surfaces, the shanty having hinged panels and being foldable between an open position and a closed position.

U.S. Pat. No. 3,479,980 Simmons, discloses a multipurpose sport vehicle chassis which can be used as a sled if desired. Arm rests, head rest and canopy can be removably attached to the chassis.

U.S. Pat. No. 798,026 Ellwanger, shows a form of sleigh in which the runners may yield to a limited extent with respect to the passenger supporting box, by relative pivotting movement along a generally horizontal, transverse axis.

U.S. Pat. No. 678,651 Erickson, describes a form of sleigh having pivotable mounting means for the box to the runners, for pivotting about a transverse axis to cushion shocks.

U.S. Pat. No. 2,464,884 Noyes, discloses a form of sled shelter wherein a shelter with a collapsible frame is mounted on a set of runners, for transportation across ice or snow surfaces and erection as an ice fishing hut.

U.S. Pat. No. 3,241,878 Beery, shows a item of infants' furniture useful as a chair, rocker, swing or sled having an upper enclosure in which the child may sit, and lower curved rockers which may also act as sled runners.

SUMMARY OF THE INVENTION

It is an object of the present invention to provide a sled affording the rider or cargo carried thereby increased protection against inclement weather.

It is a further object to provide a novel child's or infant's sled of the above type, which is simple and economical to construct and easy to operate and use.

The present invention provides a sled having a riding enclosure which can swivel relative to the sled runners, about a vertical axis. The riding enclosure has a side access aperture, presented laterally, the direction of which can thus be angularly adjusted so as to be directed away from the direction of the wind. The occupant of the sled enclosure is thus provided with enhanced protection against the elements, as well as enhanced protection against injury due to mishaps such as accidental overturning of the sled in use.

Thus, according to the present invention there is provided a sled for transportation of passengers or cargo and comprising:
mutually parallel snow traversing sled runners;
a passenger or cargo receiving enclosure mounted above the runners, said enclosure including a base and a cover defining said enclosure therebetween, and a laterally presented access aperture;
said enclosure being mounted for angular adjustment relative to the sled runners about a vertical axis, so as to vary the direction of lateral presentation of the access aperture relative to the sled runners.

DESCRIPTION OF THE PREFERRED EMBODIMENTS

The sled of the present invention is primarily intended for use in transporting infants and small children, affording them extra protection against wind, blowing snow etc. However, it is not to be construed as limited thereto, and is useful in connection with transportation of a wide variety of different cargoes.

Preferably, the sled includes a frame to which the sled runners are fixedly secured, and to which the enclosure is pivotally mounted. The base of the enclosure may conveniently be made in square form, with short upstanding side walls merging into a domed cover. The access aperture is then presented through the combined side wall and domed cover, in a lateral direction, to have a smooth continuous periphery. It is preferred to make the square base of the enclosure substantially the same width as the separation of the sled runners. It is also preferred that the dome of the enclosure be transparent or translucent, for better enjoyment of the rider.

DETAILED DESCRIPTION OF THE SPECIFIC PREFERRED EMBODIMENTS

Figure 1:
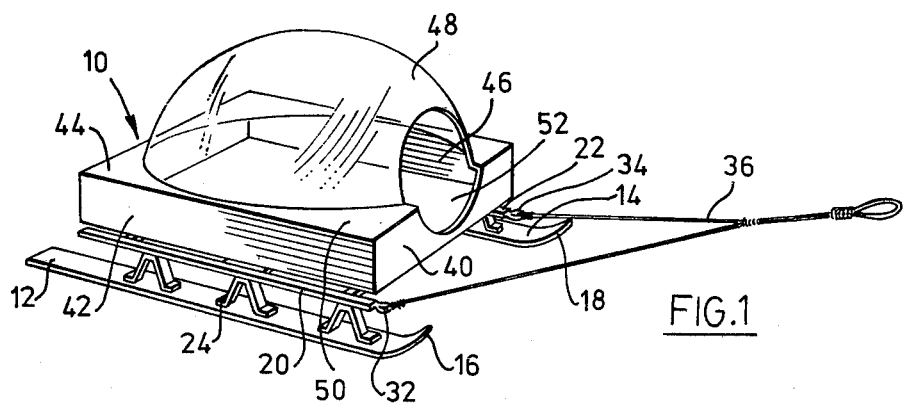
FIG. 1 is a perspective view of a sled according to the present invention.

With reference to the drawings, in which like reference numerals will indicate like parts, a sled 10 according to the invention has a pair of generally conventional snow traversing runners 12, 14 disposed mutually parallel to one another, and with the normal upturned forward ends 16, 18 respectively. The sled includes a frame having a pair of parallel longitudinal bars 20, 22, mounted above and parallel to respective runners 12, 14 and to which the respective runners are fixedly secured by means of brackets 24, as by rivetting, welding, bolting, etc. The frame also has forward, centre and rearward transverse bars 26, 28, 30 respectively (FIG. 2), extending across longitudinal bars 20, 22 and secured thereto. The front ends of the longitudinal bars 20, 22 are provided with respective eyelets 32, 34 to which a towing rope 36 is attached.

An enclosure is provided pivotally mounted to the centre transverse bar 28 of the frame. The enclosure comprises a generally square base 38 with short upstanding side walls 40, 42, 44, 46 and a clear domed cover 48 fixedly secured to the inwardly extending flange 50 of the side walls. An access aperture 52 is provided, having a generally continuous curved periphery, through side wall 40 and the side of the domed cover 48, so that the aperture 52 is presented laterally of the sled.

Figure 2:
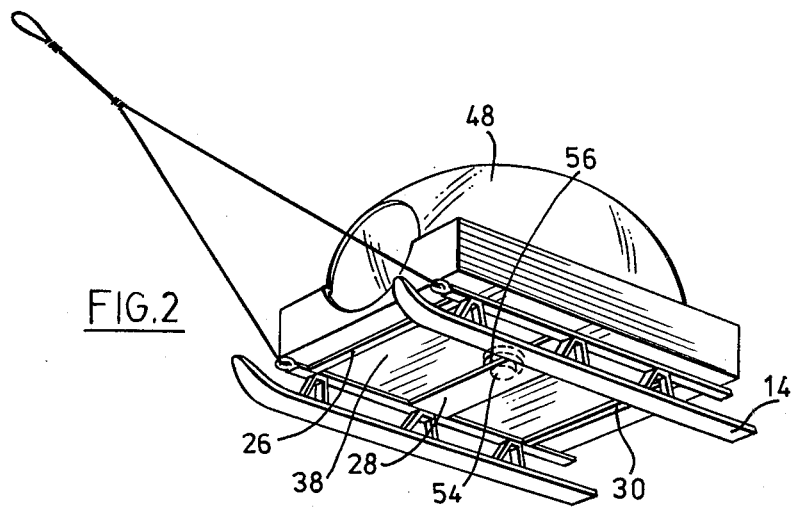
FIG. 2 is a perspective view of the sled of FIG. 1, taken from slightly underneath.
Figure 3:
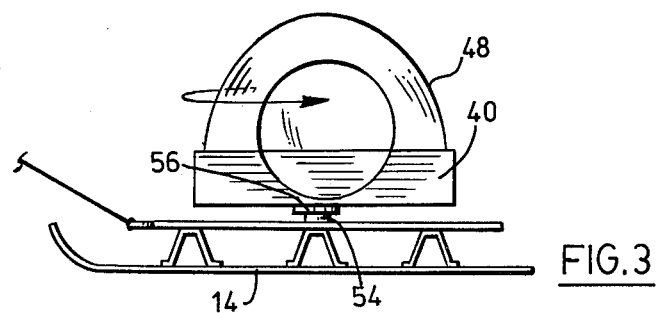
FIG. 3 is a side elevation of the sled of FIGS. 1 and 2.

The enclosure is pivotally mounted to the frame by means of a pivot 54, at the middle of the centre transverse bar 28 of the frame, received in a ball or roller bearing race 56 mounted on the underside of the centre of the square base 38. Thus, the enclosure can turn about a vertical axis through the centre of the sled 10, relative to the runners 12, 14, to present the aperture 52 in any preselected lateral direction. As illustrated, the enclosure in FIGS. 1 and 2 is presented laterally forwardly. In FIG. 3, the enclosure has been turned through 90°, to be presented to the side of the sled. The position of the enclosure can thus be adjusted to present the aperture in a direction away from the wind, to provide fuller protection of the occupant against inclement winter elements.

If desired, means can also be included to maintain or lock the enclosure in a predetermined angular position relative to the frame and the sled runners. For this purpose, a series of engaging formations may be provided on the underside of the base surface, angularly spaced, e.g. depressions, to engage with a complementary formation e.g. upwardly protruding spring loaded detent, on the frame. Such a frame is most conveniently provided on forward transverse member 26, for ease of access by the operator. In the alternative, the pivotal connection between the enclosure and the frame may be made tight enough that the enclosure will remain in a preset angular relative position. This may be accomplished by high friction in the connection.

In a further alternative, means may be provided which operate automatically to adjust the angular position of the enclosure according to the wind, so that the access aperture faces away from the wind direction. Thus, it is within the scope of the invention to provide vanes, on the cover of the enclosure or on the base thereof, upon which the wind will act to swivel the enclosure to the desired angular position. Such a vane would suitable protrude upwardly as a fin from the top surface of the enclosure, and extend from the upper, middle of the access opening diametrically across the top of the enclosure.

The sled of the invention is simple and economical to manufacture and assemble. The enclosure can if desired be made of a single moulded piece of suitable thermoplastic or thermosetting material. It should be sufficiently strong and impact resistant to afford the occupant protection against impacts in the event of overturning the sled, as well as protection against the elements. The material of construction should of course be chosen with a view to its resistance to low temperatures.

Whilst a specific preferred embodiment of the invention has been described and illustrated in detail herein, it will of course be understood that this is illustrative and is not to be construed as limiting the invention. Other modifications and variations within the scope of the invention may be made. For example, the sled may be motorized, in the form of a snowmobile, in which the runners are supplemented by power driven tracks. In such case, the enclosure may be in addition to a conventional seat for another driver or passenger. The device may be made in a wide variety of different sizes. The scope of the invention is limited solely by the appended claims.

What is claimed is:

1. A sled for transportation of passengers or cargo and comprising:
   a frame;
   mutually parallel snow traversing sled runners fixedly secured to said frame;
   a passenger or cargo receiving enclosure mounted above the runners, said enclosure including a generally flat base with short side walls upstanding therefrom and a domed cover defining said enclosure therebetween, and a laterally presented access aperture provided in one side wall of the base and a side of the domed cover, said access aperture having a smooth continuous boundary edge;
   said enclosure being pivotally mounted to said frame for angular adjustment relative to the sled runners and the frame about a vertical axis, so as to vary the direction of lateral presentation of the access aperture relative to the sled runners.

2. A sled according to claim 1 wherein the enclosure base is generally square and has a width which is substantially the same as the separation of the sled runners.

3. A sled according to claim 2 wherein the enclosure is pivotally mounted to the frame at the mid point of the undersurface of the enclosure base by means of a ball bearing pivot.

4. A sled according to claim 3 wherein the dome of the enclosure is transparent or translucent.

* * * * *